US00RE46213E

(19) United States
(12) Reissued Patent
Hajari

(10) Patent Number: US RE46,213 E
(45) **Date of Reissued Patent: *Nov. 22, 2016**

(54) MECHANICAL ARROW NOCKS

(71) Applicant: Khosro B. Hajari, Wesley Chapel, FL (US)

(72) Inventor: Khosro B. Hajari, Wesley Chapel, FL (US)

( * ) Notice: This patent is subject to a terminal disclaimer.

(21) Appl. No.: 14/484,623

(22) Filed: Sep. 12, 2014

Related U.S. Patent Documents

Reissue of:
(64) Patent No.: 8,267,816
Issued: Sep. 18, 2012
Appl. No.: 13/041,401
Filed: Mar. 6, 2011

U.S. Applications:
(63) Continuation of application No. 12/287,445, filed on Oct. 8, 2008, now Pat. No. 7,922,609.

(51) Int. Cl.
*F42B 6/06* (2006.01)
*F42B 12/36* (2006.01)

(52) U.S. Cl.
CPC ..... *F42B 6/06* (2013.01); *F42B 12/362* (2013.01)

(58) Field of Classification Search
CPC ..... F42B 6/06; F42B 12/362
USPC ..... 473/578, 585, 586
See application file for complete search history.

(56) References Cited

U.S. PATENT DOCUMENTS

| | | | | | |
|---|---|---|---|---|---|
| 3,034,789 | A * | 5/1962 | Moore | | 473/578 |
| 4,111,424 | A * | 9/1978 | Schreiber et al. | | 473/578 |
| 4,421,319 | A * | 12/1983 | Murphy | | 473/570 |
| 4,900,037 | A * | 2/1990 | Miller | | 473/586 |
| 5,134,552 | A * | 7/1992 | Call et al. | F21L 15/00 | 362/109 |
| 5,186,470 | A * | 2/1993 | Easton et al. | | 473/578 |
| 5,642,887 | A * | 7/1997 | Orav | | 473/586 |
| 5,846,147 | A * | 12/1998 | Basik | | 473/586 |
| 5,971,875 | A * | 10/1999 | Hill | | 473/578 |
| 6,123,631 | A * | 9/2000 | Ginder | | 473/570 |
| 6,203,457 | B1 * | 3/2001 | Snook | | 473/586 |
| 6,478,700 | B2 * | 11/2002 | Hartman | | 473/578 |
| 6,595,880 | B2 * | 7/2003 | Becker | | 473/578 |
| 6,877,500 | B1 * | 4/2005 | Hollars et al. | | 124/24.1 |
| 7,189,170 | B1 * | 3/2007 | Korsa et al. | | 473/578 |
| 7,922,609 | B1 * | 4/2011 | Hajari | | 473/578 |
| 2003/0171174 | A1 * | 9/2003 | Price et al. | | 473/578 |

FOREIGN PATENT DOCUMENTS

| | | | | |
|---|---|---|---|---|
| JP | 2003035500 | * | 2/2003 | F42B 6/06 |

* cited by examiner

*Primary Examiner* — Jeffrey R Jastrzab
(74) *Attorney, Agent, or Firm* — Edward P Dutkiewicz

(57) ABSTRACT

An arrow nock having a telescoping impeller and housing with resilient means for enhancing the acceleration of launch. In various embodiments, effective together or independently, the housing and impeller are configured and coupled to: create arrow rotation during launch; grip the bowstring during notching and release it during launch; and generate tracking signals.

23 Claims, 6 Drawing Sheets

MECHANICAL ARROW NOCKS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

This application is a continuation of U.S. application Ser. No. 12/287,445 filed on Oct. 8, 2008, which is incorporated by reference in its entirety. The present invention relates to archery arrow nocks, and more particularly to arrow nocks designed to yield superior ballistic arrow performance and to facilitate arrow recovery.

Archers all wish to have maximum control over the flight of their arrow. They often find it desirable to customize their arrows depending upon the targets involved or game hunted and they seek reliability in their equipment and consistency in its performance.

Satisfactory arrow flight involves: consistency, accuracy, distance, speed of travel, drop, reaction to cross wind, reaction to environment and target penetration.

It is well appreciated that arrow flight is affected by the structure of the arrow and by the structure and nature of the launching bow. Simplistically, this is reflected in the use of properly weighted, straight balanced arrows cleanly launched by a well-strung taut bowstring. Satisfactory flight is determined by the equipment, both during launch and after arrow release. There are many arrow and bow designs having the objectives of improving arrow ballistics, improving launch, controlling flight, extending distance, and enhancing target penetration. There are also many structures adapted for inclusion or attachment to arrow shafts and bows to achieve these objectives, either independently or in conjunction with structural modifications of the launching bow.

It is recognized that the flight of an arrow is stabilized by rotation. This is commonly imparted by fletching affixed to the arrow which induces rotation responsive to air movement during arrow trajectory. Alternatively, arrow rotation may be induced before or during arrow launch by providing torsional force on the arrow shaft. Thus, it is understood that the arrow flight may be determined during the control exerted over the arrow by the bowstring upon initial engagement, during bowstring release, during bowstring pressure before launch, and as the arrow commences flight when the bowstring begins relaxation.

As a practical matter, it is also important to recognize the economic benefit of having arrows that can be used with a variety of bows. Obviously it is also desirable to be able to reuse spent arrows, something that can be facilitated by appropriate tracking means, damage resistant and/or easily repaired or replaced components.

2. Description of Related Art

The prior art is replete with flight stabilizers, arrow accelerating devices and special nocks for attachment to specially designed arrows. Many devices are disclosed for attachment to arrows to track flight and detect their landing sites.

U.S. Pat. No. 4,900,037 to Miller suggests that increased arrow acceleration can be obtained by inserting a spring within telescoping sleeves at the rear of a hollow arrow shaft. During bowstring, draw, this spring is extended. Upon bowstring release, energy is stored by compressing the spring. This energy is released by spring extension as the arrow leaves the bow.

U.S. Pat. No. 5,971,875 to Hill discloses a notched spinner tube having spiraled grooves on its outer surface to engage dimples on the inside of an arrow shaft that has been deformed by a special tool. When the arrow is launched, the spinner tube is forced into the arrow shaft and the spiral grooves of the spinner tube act upon the dimples on the arrow shaft causing the arrow to rotate.

U.S. Pat. No. 6,478,700 to Hartman discloses an arrow spin drive having a screw shaft containing cam surfaces that cooperate with a guide inside a hollow arrow shaft to impart rotation when the arrow is launched.

U.S. Pat. No. 6,203,457 to Snook discloses a removable nock having a special curves notch into which the bowstring is placed. The notch has a twisted opening so that as the arrow leaves the bowstring, a torsional force is imparted.

U.S. Pat. No. 6,877,500 to Hollers and Edwards discloses a helically slotted spin tube attached to a bow for imparting arrow rotation as the arrow traverses the tube during launch. A nock drive assembly cooperates with the bow spin tube. When the bowstring is released, the nock drive assembly moves laterally within the spin tube while a nock pin travels along the helical slot imparting rotation to the arrow.

Among other patents disclosing arrangements for inducing arrow rotation, on my note U.S. Pat. No. 4,111,424 to Schreiber et al, U.S. Pat. No. 5,846,147 to Basik, and U.S. Pat. No. 6,595,880 to Becker. Of additional possible interest with respect to nocks designed to effect arrow performance, one may note U.S. Pat. No. 4,900,037 to Miller, U.S. Pat. No. 5,134,552 to Call and Denen, and U.S. Pat. No. 5,186,470 to Easton and Filice.

While the prior art contains disclosures of diverse archery equipment calculated to improve arrow performance, none of this disclosed equipment shows or suggests the structure of the arrow nocks embodying the present invention, or results attainable through the use of these nocks. Nor is there any disclosure of arrow nocks containing elements assembled in the manner of the present invention which can be applied to conventional arrows in the field to accommodate perceived field conditions.

SUMMARY OF THE INVENTION

Improvement of arrow ballistics requires attention to the structure and balance of the arrow. This can in most cases be assured by use of known conventional arrows and not impairing the proven characteristics of these arrows with weight and balance distorting supplementary devices.

The present invention is embodied in arrow nocks for attachment to conventional arrow shafts. These nocks improve arrow ballistics and increase arrow velocity. They enhance the notching procedure, facilitate arrow tracking and permit discretionary selection of desired properties in the field.

The main object of the present invention is to economically provide arrow nocks that can be installed on conventional arrows to improve the flight characteristics of the arrows when launched even from conventional bows.

Another object of the invention is to provide an arrow nock suitable for installation on conventional arrows to enhance flight stability, acceleration, distance and target penetration.

Another object of the invention is to provide arrow nocks that can be selected and/or adjusted in the field, without special tools, to adapt conventional arrows for diverse conditions of target, environment and windage.

Another object of the invention is to provide arrow nocks that facilitate safely securing arrows to the bowstring so that the bow may be carried with the arrow mounted and ready to launch.

And, another object of the invention is to provide arrow nocks that generate signals permitting an archer to track their arrows in flight and/or locate their arrows when spent.

The invention features a unique nock structure permitting filed installation on conventional arrow shafts.

In one embodiment, the featured arrow nock includes integral resilient means for generating arrow acceleration and velocity greater than that imparted by the bowstring.

In a particular illustrative embodiment, the featured arrow unique nock comprises housing and impeller elements that, upon release of a launching bowstring, produce axial rotation of the arrow.

In another particular illustrative embodiment, the featured arrow nock comprises a gripper that secures the arrow to a bowstring until automatically released during launch.

In another particular illustrative embodiment, the featured arrow nock includes a signal generator that is activated when the arrow is launched to generate a tracking signal that can be enabled during flight or when the arrow lands.

These objects and features are achieved with arrow nocks comprising a cylindrical housing configured for rigid mounting at the end of a conventional arrow shaft. An impeller is axially mounted within the housing and projects from one end thereof; the opposite end of either the housing or the impeller terminates in a notch for engagement with a bowstring. The housing and impeller are biased apart along their common longitudinal axis by resilient means. Cocking means are provided to overcome the bias and hold the housing and impeller in close proximity. When launched, from a bowstring, the nock is uncocked and under the pressure of the resilient means, the housing and impeller are driven in axially opposite directions.

In one of several illustrative embodiments the nock housing and impeller are coupled to effect relative rotation about their common longitudinal axis when axially displaced by pressure of the resilient means.

In another one of the illustrative embodiments, the nock is provided with a movable gripper in the notch. This gripper is coupled to the impeller to block the entrance to the notch when the nock is cocked and to automatically open the entrance to the notch when the housing and impeller are driven apart.

In still another illustrative embodiment, signaling means and an energy source are provided. Electrical contact means are provided between the housing and impeller to connect the signaling means and energy source when the nock is released during arrow launch. Depending upon the signaling means and intent of the archer, a visual or audible signal will be generated, either upon launch or at some predetermined time thereafter.

The details of the invention, and the manner in which the objects are achieved by the features of the invention, will be more fully understood and appreciated from the detailed description and claims, taken in conjunction with the drawings.

Figure 2:
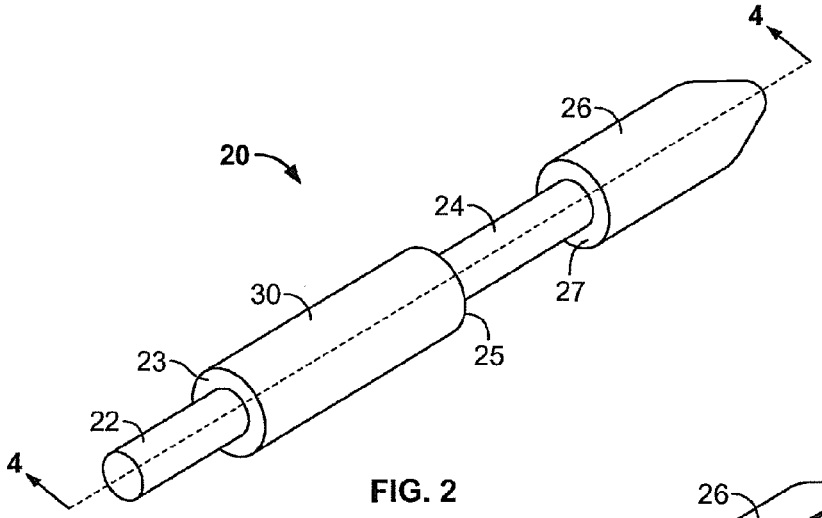
FIG. 2 is a perspective view of an arrow nock embodying the features of the invention.
Figure 11:
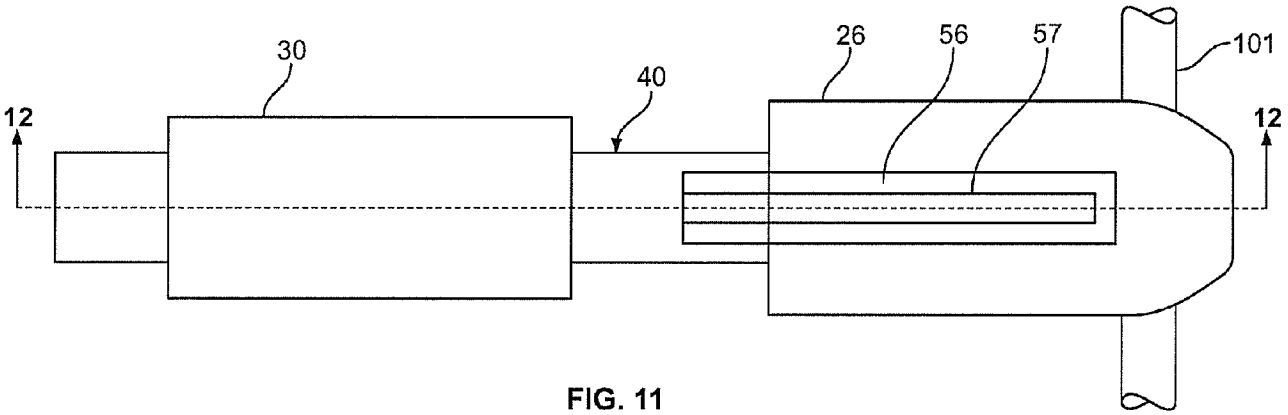
Figure 12A:
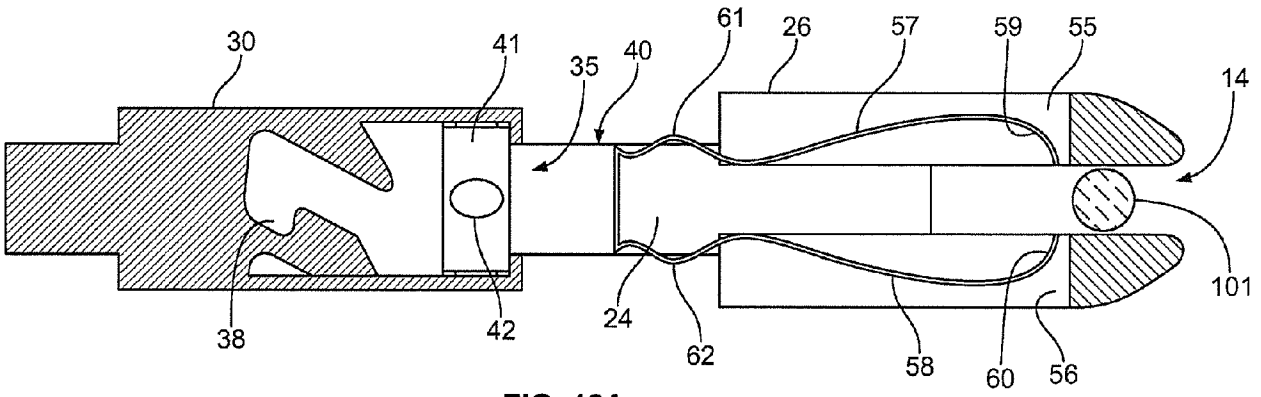
Figure 12B:
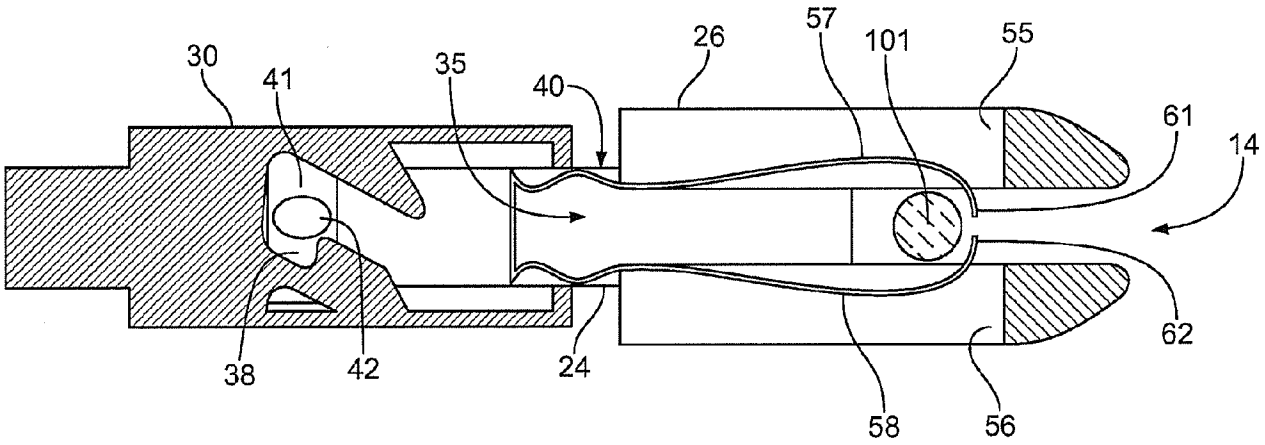
Figure 13:
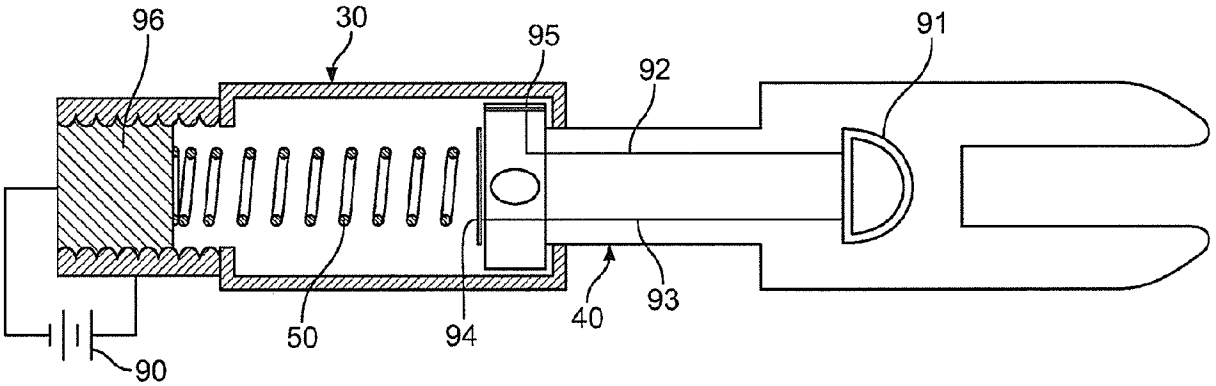

FIGS. IOA through IOD schematically illustrate the relative position of a bowstring and arrow during notching and launch;

FIG. 11 is a side view of FIG. 2 showing an arrow nock incorporating an illustrative embodiment of the invention which provides gripping means for securing an arrow to a bowstring before launch and releasing the arrow from a bowstring during launch;

FIGS. 12A and 12B are cross-sections taken along the lines 12-12 of FIG. 11, showing bowstring release and bowstring grip positions, respectively; and FIG. 13 is an illustrative partial cross-section taken along the lines 4-4 of FIG. 2, showing a nock, according to the invention, that provides visual arrow tracking.

DETAILED DESCRIPTION OF PREFERRED EMBODIMENTS

It is to be understood that the description and drawings are for illustrative explanatory purposes only. The embodiments have been chosen to explain the principles, features and characteristics of the invention, thereby enabling those skilled in the art to best utilize the invention. All equivalent variations developed by those skilled in the art are contemplated to be part of the invention, limited only by the scope of the claims.

This description of preferred embodiments presents several specific structures to illustrate the flexibility, concepts, and functioning of means by which the invention may be practiced. To render the operation and concepts of the invention more understandable, the illustrations have been enlarged and simplified. No attempts should be made to compare the dimensions of the various Figures.

Clearly, the weight, weight distribution, and symmetry about the axis of the arrow, is important. Accordingly, the materials and components of the nocks featuring the invention must be selected and configured with this in mind. In typical embodiments adapted for use with conventional arrow shafts of 0.25 inch diameter, the housing of the nock would be of substantially similar diameter, providing a smooth and uninterrupted transition from the end of the arrow shaft. In an extended quiescent condition, the nock may be 3.50 inches long from tip to tip. Those skilled in the art will appreciate the appropriate sizes of the components described and will recognize the common materials and elements to be used in the assembly of practical structures embodying the invention.

Figure 1:
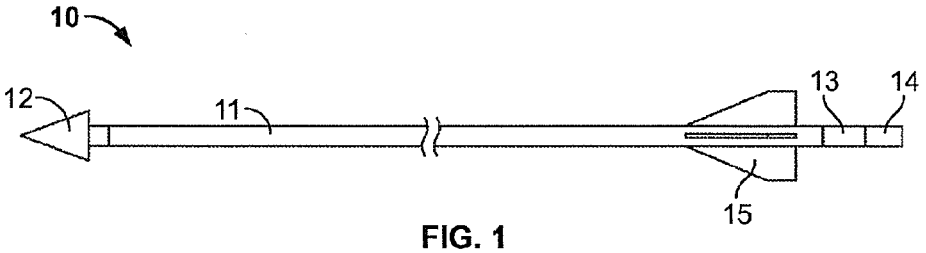
FIG. 1 is a side view of an arrow incorporating an illustrative embodiment of the invention.

FIG. 1 illustrates a conventional arrow 10 having a shaft 11, with a tip 12 on its forward end and a bowstring notch 14 on its distal end. Not infrequently, as in the present invention, notch 14 may be formed as part of a separate attached nock 13, which rigidly mounted at the distal end of arrow shaft 11. Fletching 15 is commonly used to improve the arrow flight characteristics. While not necessary for arrows using the nocks of the present invention, fletching on either the arrow or the nock, is an option that may be adopted.

The present invention relates to the structure of unique nocks that are suitable for mounting by partial insertion into the distal end of a hollow arrow shaft 11. Nocks embodying the unique features of the invention may also be configured to slip over the distal end of arrow shafts.

FIG. 2 shows an arrow nock 20, according to an embodiment of the invention, comprising a cylindrical housing 30, a projecting rod 22 extending from the closed leading end 23 of housing 30 and a shaft 24 projecting from the distal end 25 of housing 30. Bowstring notch element 26 is provided at the rear of nock 20. Notch element 26 may be an integral part of shaft 24, or may be rigidly attached thereto.

In the embodiments to be described, projecting rod 22 is dimensioned to fit within the hollow end of an arrow shaft either permanently or be secure frictional fit. As previously noted, rather than employing projecting rod 22, the forward end of the nock may be formed as a cylinder that would embrace the end of an arrow shaft. The outside diameter of housing 30 is preferably substantially the same as the diameter of the arrow shaft to which the nock is affixed. Similarly, the outer diameter of bowstring notch element 26 is preferably substantially the same as the diameter of the arrow shaft.

Figure 3:
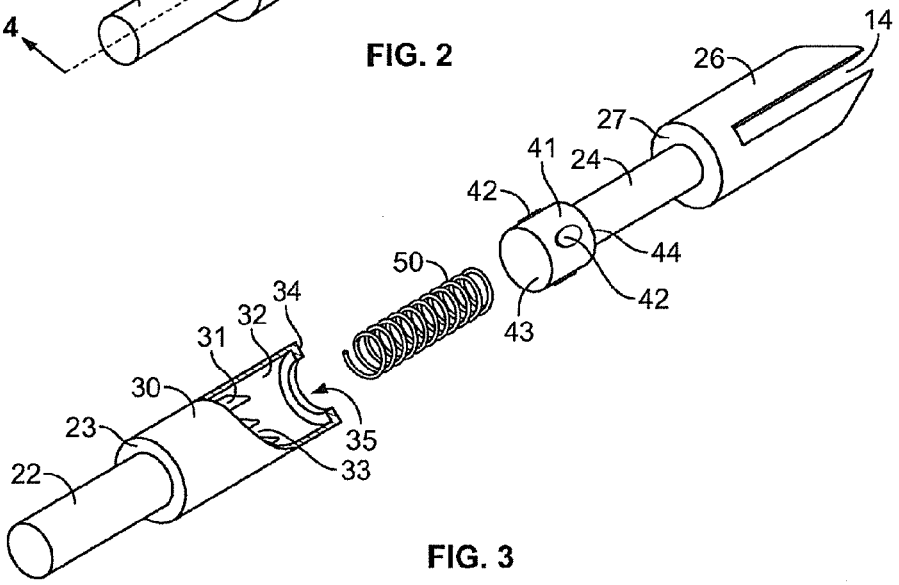
FIG. 3 is an exploded perspective view, partially in cross-section, of an arrow nock showing the general configuration and orientation of various principle components of an illustrative embodiment of the invention.

FIG. 3 is an exploded perspective view, partially in cross-section, showing the structure of elements comprising an illustrative embodiment of the invention wherein use of the nock imparts speed and rotation to the arrow during launch. In this embodiment, shaft 24 is an integral part of an impeller 40 that is controlled to move axially within housing 30.

Nock housing 30 is a cylinder with a leading end 23 and a distal end 25. Distal end 25 has a depending edge 34 defining an aperture 35 permitting axial passage of shaft 24 while preventing passage of cylindrical portion 41 of impeller 40, thus insuring entrapment of portion 41. The inner surface 31 of housing 30 is provided with a series of radially disposed longitudinally twisting guide channels 33 terminating near the distal end in a circumferential channel 32. The nature and interrelationship of housing 30 and impeller 40 will be described more specifically in connection with FIGS. 5-9.

Nock impeller 40 includes forward cylindrical portion 41 having outside diameter slightly less than the diameter of inner surface 31 of housing 30, such that it may be axially mounted for translation within housing 30.

Channel followers 42 are radially disposed about the surface of cylindrical portion 41 in positions coinciding with guide channels 33. The height of followers 42 is substantially equal to the depth of guide channels 33 so that during translation of impeller 40 through housing 30, followers 42 are committed to track within guide channels 33. As described hereinafter, suitable configuration of channels 33 determines whether or not there can be relative axial movement between housing 30 and impeller 40.

Channel 32, at the distal end of housing 30, extends around the entire inner circumference and opens at the front end into guide channels 33. Followers 42 are configured to reside within the groove of channel 32 when impeller 40 and housing 30 are at a predetermined extended axial position relative to one another. In this position housing 30 and impeller 40 are completely decoupled and may rotate without effect upon one another.

Resilient means 50 are interposed between the leading face 43 ofimpeller 40 and the inside of front face 23 of housing 30. Resilient means 50 provides an axial separating force between housing 30 and impeller 40. In the expanded quiescent position, channel followers 42 on impeller surface 44, are axially located within channel 32 and accordingly housing 30 and impeller 40 are free for independent rotation. The force of resilient means 50 may be modified for use of the nock with various arrows and particular bowstring tension, to achieve specific flight conditions. One expedient for effecting increased or decreased compression of resilient means 50 is shown as a tension screw 96 in FIG. 13.

In this embodiment, resilient means 50 comprises a [com pression] spring. Suitably stressed and/or compressed rubber or other material may also be employed.

While one preferred embodiment of the invention provides a nock that causes rotation and added acceleration during arrow launch, it may also be advantageous for an archer to opt simply for added acceleration with, or without, the signaling features to be described hereinafter.

Figure 4:
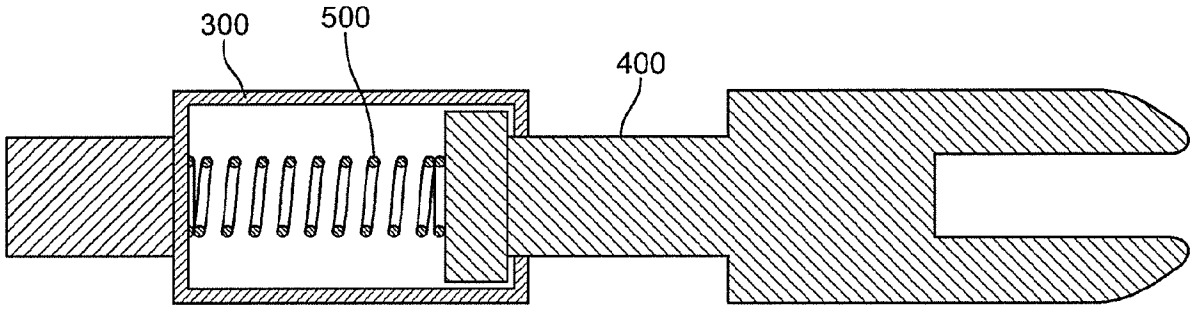
FIG. 4 is an illustrative cross-section taken along the lines 4-4 of FIG. 2.

An acceleration nock only, as shown in the embodiment of FIG. 4 illustrates a housing 300 that does not include cam grooves 33 and impeller 400 does not have cam followers. The cross-section schematic of FIG. 4, taken along lines 4-4 of FIG. 2, illustrates how a spring 500 biases housing 300 and impeller 400 axially apart. It will be understood that translation of impeller 400 within housing 300 is effected by applying external axial force in opposition to the force of biasing spring 500. This external force may be applied manually by the archer prior to or during notching the arrow on a bowstring.

Prior to arrow launch, nock housing 300 and impeller 400 are axially pressed together by a compressing spring 500. During release from a drawn bowstring, housing 300 and impeller 400 are released and axially displaced by the expansion of spring 500 whereby the arrow is subjected to both the forward directed force of the bowstring and the forward directed force of the compressed spring, enhancing the driving force for its flight.

The FIGS. 5-13 show how nock of the present invention may be designed to cock accelerate, rotate, secure and track conventional arrows.

FIGS. 5-9 describe a design for coupling a housing 30 and an impeller 40 to cock the elements and thereafter effect rotation.

Figure 5:
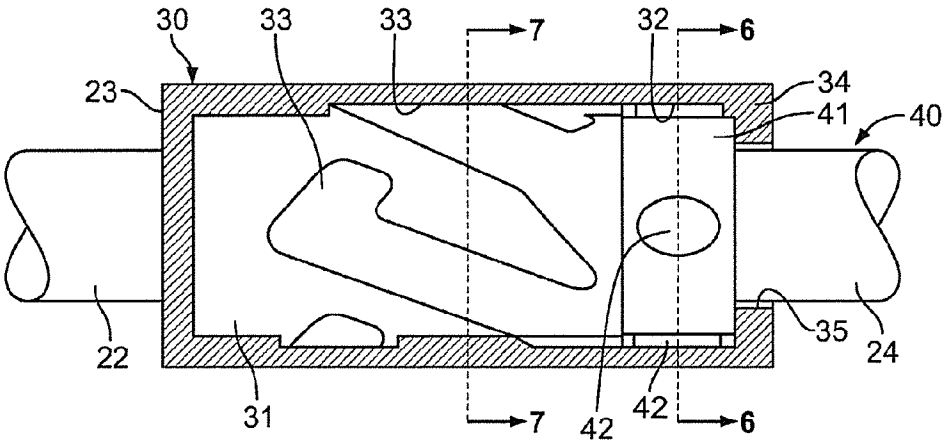
FIG. 5 is an illustrative partial cross-section of a nock having a cylindrical housing and impeller designed to rotate an arrow upon launch.
Figure 6:
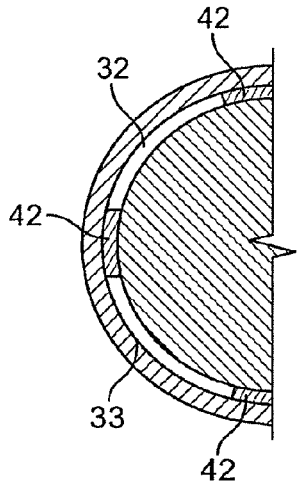
FIG. 6 is a cross-section view taken along the lines 6-6 in FIG. 5.
Figure 7:
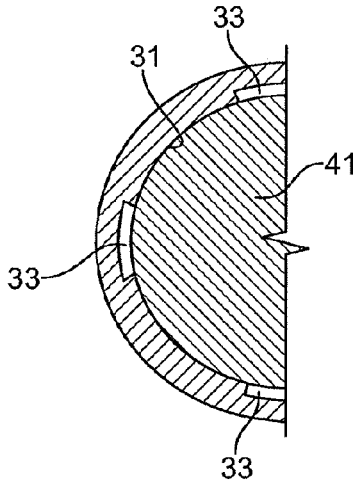
FIG. 7 is a cross-section view taken along the lines 7-7 in FIG. 5.

FIG. 5 is an enlarged cross-sectional view of housing 30 with resilient means 50 removed and with impeller 40 positioned within circumferential channel 32. Four impeller followers 42 are distributed about the face of impeller cylinder 41, axially positioned in circumferential channel 32 of housing 30. Rotationally, followers 42 are located for entrance into longitudinal guide channels 33 when impeller 40 and housing 30 are moved together. The FIG. 6 cross-section taken along the lines 6-6 of FIG. 5 reveals the circumferential freedom of impeller 40 within channel 32. The FIG. 7 cross-section shows the empty channels 33 when impeller 40 is at the distal end of housing cylinder 30.

Clearly, the axial position of impeller 40 within channels 33, determines the relative rotational position of housing 30 and impeller 40. As impeller 40 traverses the portion of housing 30 containing longitudinal channels 33, if impeller 40 is restrained from rotation, housing 30 will rotate, and with it, any attached arrow.

The specific configuration of channels 33 as at the discretion of the designer. To provide a nock simply for enhanced arrow acceleration and velocity, channels 33 may be aligned with the axis of cylinder 30. To provide a nock for rotating an attached arrow during launch, channels 33 may be twisted as they extend longitudinally along the length of cylinder 30.

If channels 33 are to participate in the function of cocking the nock, as described hereinafter, they may be configured to include a cocking section. Ifchannels 33 are to participate in activating a signal unit, they may be selectively configured at appropriate axial positions to effect connection of a power source to the signal unit. The invention contemplates that specific nock design will be chosen to effect one or more of the functions noted.

The number of guide channels 33 is not a limited factor. In the illustrative embodiment shown in FIGS. 5-9, there are four guide channels 33, each with twisting or wrapping about 90 degrees of cylinder surface. This particular design provides interaction between channels 33 and followers 42 to cock the nock, impart arrow rotation upon launch, and enhance arrow acceleration and velocity.

Figure 8:
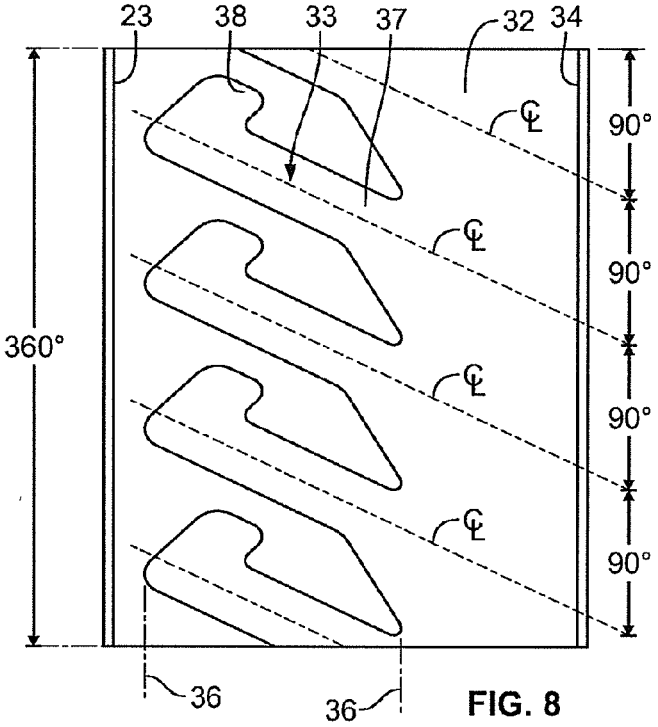
FIG. 8 is a schematic layout of the interior surface of a cylindrical nock housing showing one means for achieving the relative rotation, cocking and release of the housing and impeller.

FIG. 8 is a layout view of the inner surface 31 of housing cylinder 30 showing an illustrative configuration of channels 32 and 33 upon and within the inner surface 31 of cylindrical housing 30. As previously noted, these channels have a width and depth to accommodate followers 42 on impeller 40.

Channel 32 is located at the trailing edge of housing cylinder 30, adjacent to depending end 34 and extends without interruption about the entire inner circumference.

Four channels 33 are longitudinally disposed over a portion 36 of inner surface 31. Channels 33 are in front of channel 32, each having a center line traversing 90 degrees of the inner circumference. Each channel 33 has an elongated longitudinal section 37 terminating at its trailing end in channel 32. Each channel 33 has a cocking section 38 at the leading end adapted to receive a follower 42 when resilient means 50 is maximally compressed and housing cylinder 30 is slightly rotated with respect to impeller 40.

Figure 9:
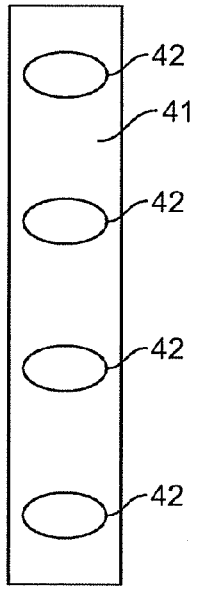
FIG. 9 is a schematic layout of the exterior surface of a nock impeller showing one means for interaction with the inner housing surface of FIG. 8 for achieving the relative rotation, cocking and release of the housing and impeller.
Figure 10A:
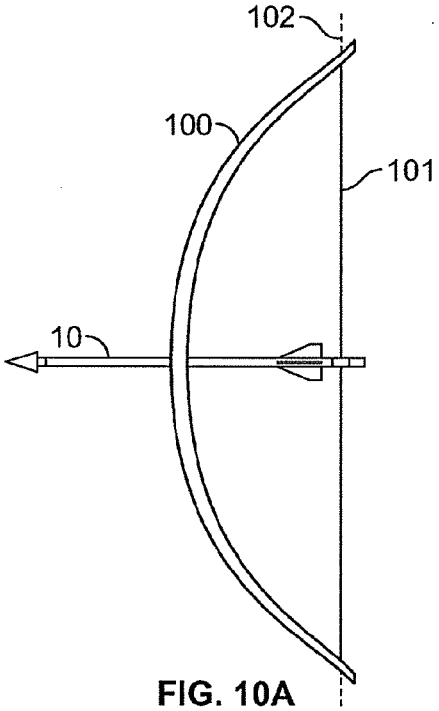
Figure 10B:
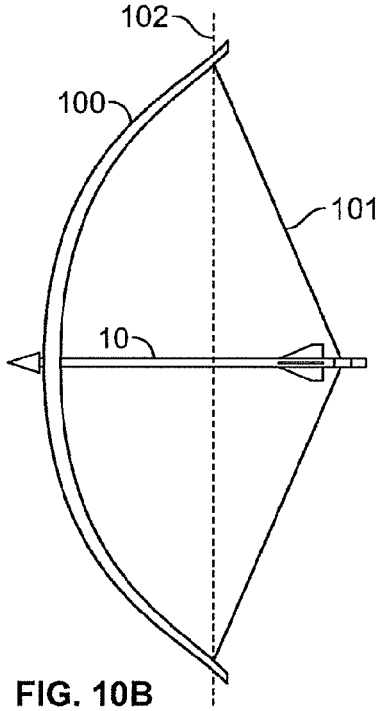
Figure 10C:
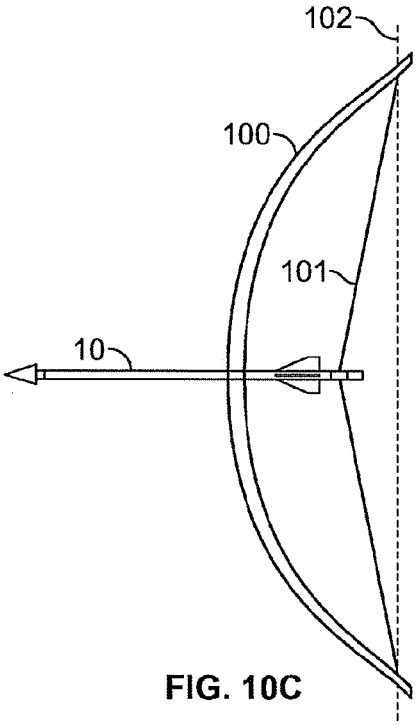
Figure 10D:
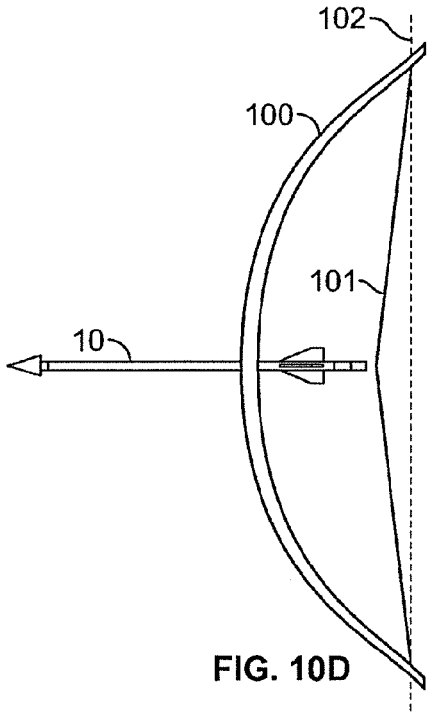

FIG. 9 is a layout of the surface 41 of impeller cylinder 41 with four followers 42 disposed at 90 degree intervals about its circumference. To appreciate the interaction of housing cylinder 30 and impeller 40, FIG. 8 and FIG. 9 arejuxtaposed.

When housing cylinder 30 and impeller 40 are assembled, their coupling permits free unimpeded rotation of the elements when followers 42 are in channel 32; imposes relative rotation of cylinder 30 and impeller 40 as followers 42 move along portion 36; and prevents axial displacement when followers 42 are in cocking sections 38.

In use, the nock is "cocked" by pressing nock impeller 40 into nock housing 30, e.g., towards the tip of an attached arrow. This is accomplished by applying compressive pressure between nock impeller 40 and nock housing 30 while rotating either the arrow or impeller 40. This pressure causes impeller 40 to track followers 42 within channels 33. Upon reaching the forward end of channels 33, followers 42 come to rest within cocking sections 38 holding impeller 40 and housing cylinder 30 together in a cocked condition with resilient means 50 substantially fully compressed. When impeller 40 is moved slightly forward, as during arrow launch, followers 42 are urged to move into channel portion 36, forcing cylinder 30 and impeller 40 apart under the expansion of resilient means 50.

Having described the structure of a nock exhibiting the features of the invention, it is worthwhile to consider its operation when attached to an arrow and launched from a bow. While the nock may be cocked by pressing it forward and rotating the arrow or nock until it is cocked. This cocking action may also be effected during notching of the arrow onto a bowstring, by pressing and turning the arrow with the notch in position on the bowstring.

FIG. IOA thought FIG. IOD schematically illustrates an arrow 10 notched to a bowstring 101 during four relevant stages oflaunch from a bow 100. The stages comprise: notching, FIG. IOA; bowstring draw, FIG. IOB; arrow release, FIG. IOC; and arrow launch, FIG. IOD. In each Figure, the relaxed or neutral undrawn position of bowstring 101 is denoted by dashed lines 102.

The nock may be cocked either before or during notching arrow 10 onto bowstring 101. Drawing arrow 10 back with bowstring 101, as illustrated in FIG. IOB, does not change the cocked relationship of housing cylinder 30 and impeller 40.

Upon release of bowstring 101, arrow 10 accelerates under the forward pressure of the bowstring. In addition, the pressure on impeller 40 causes followers 42 to slip out of cocking section 38 and the expansion of compressed resilient means 50 supplements the forward pressure of bowstring 101, thereby enhancing the acceleration. While impeller 40 remains secured against rotation by bowstring 101, the pressure of resilient means 50 forces followers 42 along channels 33, and housing 30 with attached arrow 11 begins to rotate.

As illustrated in FIG. IOC, bowstring 101 soon passes through its neutral position. It then begins to decelerate and arrow 10 begins to separate and commence its flight. The absence of forward pressure from bowstring 101 and the expanding pressure of resilient means 50 positions followers 42 in housing channel 32 so that arrow 10 continues rotation with no impediment.

Thus, upon launch, as arrow 10 leaves bowstring 101, as illustrate din FIG. IOD, the arrow has received primary drive from bowstring 101, supplemental nock drive from resilient means 50, and nock rotation from translation ofimpeller 40 in housing 30.

To recapitulate the results achieved with the unique nock of this invention: using a conventional arrow and bow, the archer has launched a rotating arrow with improved ballistic performance; with acceleration greater than that of the bowstring; and with enhanced flight and distance. By making it unnecessary to use fletching, the archer, in his discretion, may also improve performance under flight influencing wind and other environmental conditions.

Before describing how the basic features of the invention may be used to grip the bow string with a cocked nock, and how the housing relative to impeller movement can be used to develop tracking signals, it should be understood that nocks containing the features if this invention may be reversed end-to-end, so that the impeller is affixed to the arrow and the housing is provided with a notch at one end. It is believed that there is no need to describe this apparent modification further.

With an understanding of the structure and cooperative relationship between the elements of this invention, it will be seen that arrow nocks embodying these features lend themselves to the highly desirable inclusion of gripper elements that hold the arrow on the bowstring until it is released during arrow launch. Such a gripping action removes the need for use of friction elements within the notch. FIG. 11 is a side view of the general cross sections taken along the lines 12-12 of FIG. 11, showing release and gripping positions of grippers 57, 58.

The structure and functioning of nock housing 30 and nock impeller 40 have been previously described. The particular illustrative gripper embodiment of FIGS. 11, 12 provides interaction of housing 30 and impeller to effect arrow acceleration and rotation, but this is not necessary to the gripper function.

Opposing slots 55, 56 are provided in the walls of bowstring notch 14, 90° displaced from the opening of notch 14. Individual gripper leaf springs 57, 58, are positioned within slots 55, 56 and are dimensioned to move freely into and out of notch 14. Leaf springs 57, 58 have opposing leafs with gripping distal ends 59, 60 and forward control ends 61, 62. As illustrated in FIG. 12A, leaf springs 57, 58 are resiliently biased to a quiescent condition within slots 55, 56 so that unless "set" they leave notch 14 open.

Forward control ends 61, 62 are secured within slots 55, 56 and quiescently project above impeller shaft 24. Accordingly, when impeller 40 is moved forward into housing 30, passage through aperture 35 at the rear end of housing 30, depresses leaf springs 57, 58 and causes distal ends 59, 60 to enter and block notch 14.

Thus, as shown in FIG. 12B, when the nock is cocked with impeller followers 42 resting within cocking sections 38, leaf springs 57, 58 are forced into notch 14 at a position behind bowstring 101, securing the nock to the bowstring. During launch, impeller 40 moves towards the rear of housing 30, leaf springs 57, 58 resume their quiescent position, and notch 14 is opened to permit release of bowstring 101.

The spring coupled housing/impeller gripper nocks of the invention, permit archers to safely carry their bow with the arrow notched onto the bowstring. Furthermore, using these nocks makes it possible to use clear unimpeded notch channels for friction-free arrow launch.

The value of being able to track and retrieve arrows has been mentioned above. The arrow nocks embodying the features of this invention also lend themselves to reliably generating signals to track flight paths or identifying landing sites. FIG. 13 illustrates the components of such a nock.

FIG. 13 is a cross-sectional view taken along the lines 4-4 of FIG. 2. Cylindrical housing 30, impeller 40, and spring 50 have may the basic structure described above. By way of electrical schematic example, this embodiment of the invention includes an energy source 90 and a light emitting diode (LED) 91 connected responsive to the telescoping interaction of housing 30 and impeller 40. The specific structure of battery 90 has not been illustrated. It is obvious to those skilled in the art that typical [disc] batteries of appropriate capacity can
be mounted in an aerodynamically balanced position in housing 30, or in other embodiments, in the arrow itself.

The switching control in this embodiment is effected at contacts, 94, 95 via the conducting surface of housing 30. Conductor 92 connects LED 91 to contact 95. Conductor 93 connects LED 91 to contact 94. When impeller 40 is in the position shown, i.e. after arrow launch, conductor 92 completes the connection of LED 91 to the negative terminal of the battery 90, via contact 95 and housing 30. The connection to the positive terminal of battery 90 is effected through conductor 93, contact [92] <u>94</u>, spring 50 and tension screw 96.Any suitable design, making use of the telescoping relationship of housing 30 and impeller 40 is considered within the scope of the invention.

Of course, the described LED signal circuit will be closed upon arrow launch. A sound source may also be included within the nock, or may be substituted for LED 91. Indeed, inasmuch as the important function of the nock is to act as a switch, the invention contemplates even the remote location of signal devices, for example within the adjacent hollow shaft of an arrow.

Through the addition of time delay components, in ways immediately recognized by those skilled in the art, the signal source can be activated at some timed interval following arrow launch. Such nocks might be furnished transmitters or audible signal generators to assist in locating spent arrows.

The invention will be seen to comprise an arrow nock for mounting on the end of an arrow shaft, comprising a cylindrical housing with a telescoping impeller and resilient means biased to hold the housing and impeller apart. Cocking means are provided to hold the resilient means compressed positioning the housing and impeller with minimum axial displacement. The nock is uncocked upon arrow launch, permitting the resilient means to expand and effect maximum axial displacement between the housing and impeller. This creates arrow acceleration and velocity greater than that furnished by the launching bow.

In one embodiment, the housing and impeller are coupled to rotate when the resilient means expands. In another embodiment, a gripper is provided to hold the arrow to the bowstring when the nock is cocked. In still another embodiment, a signal source is provided and activated when the arrow is launched. Each embodiment, alone and in combination provides exceptional arrow flight and/or recovery characteristics that are of value to the archer.

While the individual embodiments of the invention have been shown and described, it is contemplated that these embodiments may be used alone or in combination. Modifications of these embodiments will be apparent to those skilled in the art. It is intended that such modifications are included within the definition of the following claims.

The invention claimed is:

1. An arrow nock for mounting on an end of an arrow shaft, comprising:

a housing having a longitudinal axis[and], *the housing* having a [set of first and second ends] *leading end and a distal end*;

an impeller disposed [along the longitudinal axis having a first end disposed] within the housing [and a second end disposed outside of] *and projects from* the housing, wherein the impeller and the housing are moveable relative to each other;

wherein movement of the housing relative to the impeller occurs rotationally and freely about the longitudinal axis; and, a [retainer] *depending edge* to capture at least one of the *ends of the impeller being a* first [or] *end and a* second end of the impeller within the housing, *the housing having a distal end with the depending edge defining an aperture to entrap the impeller*.

2. The arrow nock of claim 1, wherein movement of the housing relative to the impeller occurs [translationally] along the longitudinal axis and further comprising [a decoupling member that causes the axial rotation of] the housing [to become] *and the impeller being* decoupled [from the axial rotation of the impeller] *and able to rotate independent from each other*.

3. The arrow nock of claim 1, further comprising a resilient [member] *means* positioned to resist movement between the housing and the impeller.

4. The arrow nock of claim 3, wherein movement *and rotation* of the housing relative to the impeller occurs [translationally] along the longitudinal axis [and rotationally about the longitudinal axis].

5. The arrow nock of claim 4, further comprising [a rotator configured to cause an axial rotation of] *a resilient means causing* the impeller and the housing [relative to each other] *to rotate* in opposite directions [when the housing and impeller are translationally moved relative to each other along the longitudinal axis].

6. The arrow nock of claim 5, wherein [the rotator is further configured to cause the axial, rotation of] the impeller [in a first direction and to cause the axial rotation of the housing in a second and opposite direction both when the impeller is moved in a first translational direction relative to the housing and when the impeller is moved in a second translational direction relative to the housing] *and housing are coupled to effect relative rotation about their common longitudinal axis*.

7. The arrow nock of claim 5, wherein the [rotator is further configured to cause the axial rotation of the housing in a first direction and to cause the axial rotation of the impeller in a second and opposite direction both when the impeller is moved in a first translational direction relative to the housing and when the impeller is moved in a second translational direction relative to the housing] *rotation of the impeller and the housing occurs when the impeller and the housing are axially displaced*.

8. The arrow nock of claim 5, further comprising [a decoupling member that causes the axial rotation of the housing to become decoupled from the axial rotation of the impeller] *the housing and the impeller being decoupled and able to rotate*.

9. The arrow nock of claim 8, wherein [the rotator is comprised of one or more rotator channels] *the nock comprises a plurality of guide channels in the interior of the housing with at least one guide channel* in the interior of the housing [that each engage a respective] *engaging at least* one [of a set of one or more followers extending from the exterior of the impeller] *follower*.

10. The arrow nock of claim 9, [each of the] *wherein at least* one [or more rotator channels having] *guide channel has* a [first] *leading* end and a [second] *trailing* end and each of [the one or more rotator channels] *at least one guide channel* being configured to cause the housing and the impeller too axially rotate relative to one another in opposite directions [as the followers travel from the first end to the second end of each of the respective rotator channels].

11. The arrow nock of claim 9, wherein [the decoupling member comprises a decoupling] *the nock further comprises a circumferential* channel formed in the interior of the housing, the [decoupling] *circumferential* channel being connected to [each of the one or more rotator channels and being configured to engage each of, the one or more followers] *at least one of the at least one guide channel*.

12. The arrow nock of claim 9, further comprising:

a [locking member] *cocking section* to prevent movement of the impeller relative to the housing[; and],

[a release member to release the locking member and thereby permit movement of the impeller] *the nock being uncocked and able to rotate* relative to the housing.

13. The arrow nock of claim 12, wherein the [locking member] *cocking section* holds the resilient [member in a compressed state] *means*, and wherein release of the [locking member] *cocking section* permits movement of the resilient [member] *means* and *the uncocking of the nock* forces movement of the housing relative to the impeller.

[14. The arrow nook of claim 13, wherein the release member is operative to each of the rotator followers from each of the respective locking channels into the respective rotator channel when the housing and the impeller are translationally displaced relative to each other along the longitudinal axis by a predetermined distance.]

15. The arrow nock of claim [12] *13*, wherein the [locking member comprises a locking channel] *cocking section is* connected to one end of each of the [rotator Channels] *at least one guide channel* to engage the [rotator] followers and prevent the [rotator] followers from entering *each of* the [rotator channels] *at least one guide channel*.

16. The arrow nock of claim 3, further comprising:

a [locking member to prevent] *cocking section preventing* movement of the impeller relative to the housing[; and],

[a release member to release the locking member and thereby permit] *the uncocking of the cocking section permitting* movement of the impeller relative to the housing.

[17. The arrow nock of claim 16, wherein the locking member holds the resilient member in a compressed state, and wherein release of the locking member permits movement of the resilient member and forces movement of the housing relative to the impeller.]

18. An arrow nock for mounting on an end of an arrow shaft, comprising:

a housing having a longitudinal axis[and], *the housing* having a [set of first and second ends] *leading end and a distal end*;

an impeller disposed [along the longitudinal axis having a, first end disposed] within the housing and [a second end disposed outside of] *projects from* the housing, wherein the impeller and the housing are moveable relative to each other;

*a distal end of the housing configured to capture at least one of the ends of the impeller being a first end of the impeller and a second end of the impeller within the housing, the housing having a distal end defining an aperture to entrap the impeller;* a resilient [member] *means* positioned to resist movement between the housing and the impeller;

a [locking member to hold] *cocking section preventing movement of* the impeller [in a fixed position] relative to the housing; and,

[a release member to release the locking member to permit] *a release from a drawn bowstring which is engaged in the nock causing the release of the housing and the impeller permitting* movement of the impeller relative to the housing.

19. The arrow nock of claim 18, wherein the [locking member] *cocking section* holds the resilient [member] *means* in a fixed state, and wherein [release of the locking member] *the uncocking of the nock* releases the resilient [member] *means* from the fixed state.

[20. The arrow nock of claim 18, wherein the release member is operative in response to compression of the resilient member while in the fixed state.]

21. An arrow nock for mounting on an end of an arrow shaft, comprising:

a housing having longitudinal axis and having a [set of first and second ends] *leading end and a distal end*;

an impeller disposed [along the longitudinal axis having first end disposed] within the housing and [a second end disposed outside of the housing] *projects from the housing,* wherein the impeller and the housing are moveable relative to each other;

a [means] *bowstring notch* for engagement by a bowstring;

*a retainer to capture at least one of the ends of the impeller being a first end of the impeller and a second end of the impeller within the housing, the housing having a distal end defining an aperture to entrap the impeller;* a releasable gripper movable within the nock to selectively [retain] *hold the arrow on* the bowstring[, limiting disengagement of the bowstring] prior to launch, and release the bowstring *when the housing and impeller are axially displaced,* providing clear passage for the bowstring upon launch of the arrow.

22. The arrow nock of claim 21, further comprising a resilient [member] *means* positioned [to resist movement] between the housing and the impeller; [and,]

a [locking member to prevent] *cocking section preventing the* movement of the impeller relative to the housing and [to hold] *holding* the resilient [member] *means* in a fixed position; [and,]

[a release member to release the locking member to permit] *uncocking of the nock permitting* movement of the impeller relative to the housing, [and,]

wherein the releasable gripper is operable to retain the bowstring when the [locking member holds the resilient member in a fixed position] *nock is cocked*.

[23. The arrow nock of claim 21 further comprising a resilient member positioned to resist movement between the housing and the impeller.]

[24. The arrow nock of claim 23 wherein the releasable gripper functions as a locking member to prevent movement of the impeller relative to the housing.]

[25. The arrow nock of claim 21 wherein the position of the releasable gripper is determined by the position of the housing relative to the impeller.]

26. The arrow nock of claim 21 further comprising*;* an energy source;

an electrical component operative when connected to the energy source; and a [connector] *conductor* mounted on the nock [and the releasable gripper] to connect the energy source and the electrical component when the [releasable gripper] *impeller* is in a predetermined position.

27. An arrow nock for mounting on an end of an arrow shaft, comprising:

a housing having a longitudinal axis and having [set of first and second ends] *a leading end and a distal end*;

an impeller disposed [alone] *along* the longitudinal axis having [first] *a leading* end disposed within the housing and [a second end disposed outside of the housing,] *projects from the housing* wherein the impeller and the housing are moveable *in axially opposite directions* relative to each other;

an energy source;

an electrical component operative when connected to[.] the energy source; and, a [connector] *conductor* mounted [on] *between* the housing and the impeller *with the housing having a conducting surface which is used* to connect the energy source and the electrical component when the housing is in a predetermined position relative to the impeller.

28. The arrow nock of claim 27, wherein the electrical component comprises[,] a signal generator.

29. The arrow nock of claim 28, further comprising a timer operative to establish the connection after predetermined time interval following operation of the [connector] *conductor*.

* * * * *